(12) United States Patent
Gil et al.

(10) Patent No.: US 7,845,253 B2
(45) Date of Patent: Dec. 7, 2010

(54) TANSMISSION ARRANGEMENT

(75) Inventors: Mónica Gil, Madrid (ES); Francisco Rueda, Madrid (ES)

(73) Assignee: Deere & Company, Moline, IL (US)

( * ) Notice: Subject to any disclaimer, the term of this patent is extended or adjusted under 35 U.S.C. 154(b) by 770 days.

(21) Appl. No.: 11/659,416

(22) PCT Filed: Jul. 28, 2005

(86) PCT No.: PCT/EP2005/053701

§ 371 (c)(1),
(2), (4) Date: Aug. 28, 2007

(87) PCT Pub. No.: WO2006/013188

PCT Pub. Date: Feb. 9, 2006

(65) Prior Publication Data

US 2009/0107288 A1  Apr. 30, 2009

(30) Foreign Application Priority Data

Aug. 3, 2004  (DE) .................. 10 2004 037 580

(51) Int. Cl.
*F16H 57/02* (2006.01)
(52) U.S. Cl. .................................................. 74/606 R
(58) Field of Classification Search ............... 74/606 R; 56/12.3; 184/6.12
See application file for complete search history.

(56) References Cited

U.S. PATENT DOCUMENTS

| 3,686,732 | A  | * | 8/1972 | McClure et al. ......... 29/890.124 |
| 6,273,214 | B1 | * | 8/2001 | Schumacher ............... 184/6.12 |
| 2007/0193408 | A1 | * | 8/2007 | Martinez ..................... 74/609 |

* cited by examiner

*Primary Examiner*—Vicky A Johnson

(57) ABSTRACT

The invention relates to a transmission arrangement (10). Said transmission arrangement (10) comprises a transmission housing (16), a transmission chamber (12) surrounded by the transmission housing (16), a first shaft (20) mounted in the transmission housing (16), a cavity (88) embodied in the first shaft (20) eccentrically to the rotational axis (18) with the cross-sectional centre of gravity thereof, and a channel (156) embodied in the first shaft (20). Said channel (156) connects the transmission chamber (12) to the cavity (88) of the first shaft (20). The aim of the invention is to improve the lubrication process of the transmission arrangement (10) and the operating reliability, thus extending the maintenance intervals. To this end, the channel (156) is provided with a component (162) which is used to reduce the passage cross-section of the channel (156), and by which means only an optimised quantity of lubricant is transported through the channel (156). One such transmission arrangement is used for example for driving a cutter on a combine harvester.

25 Claims, 11 Drawing Sheets

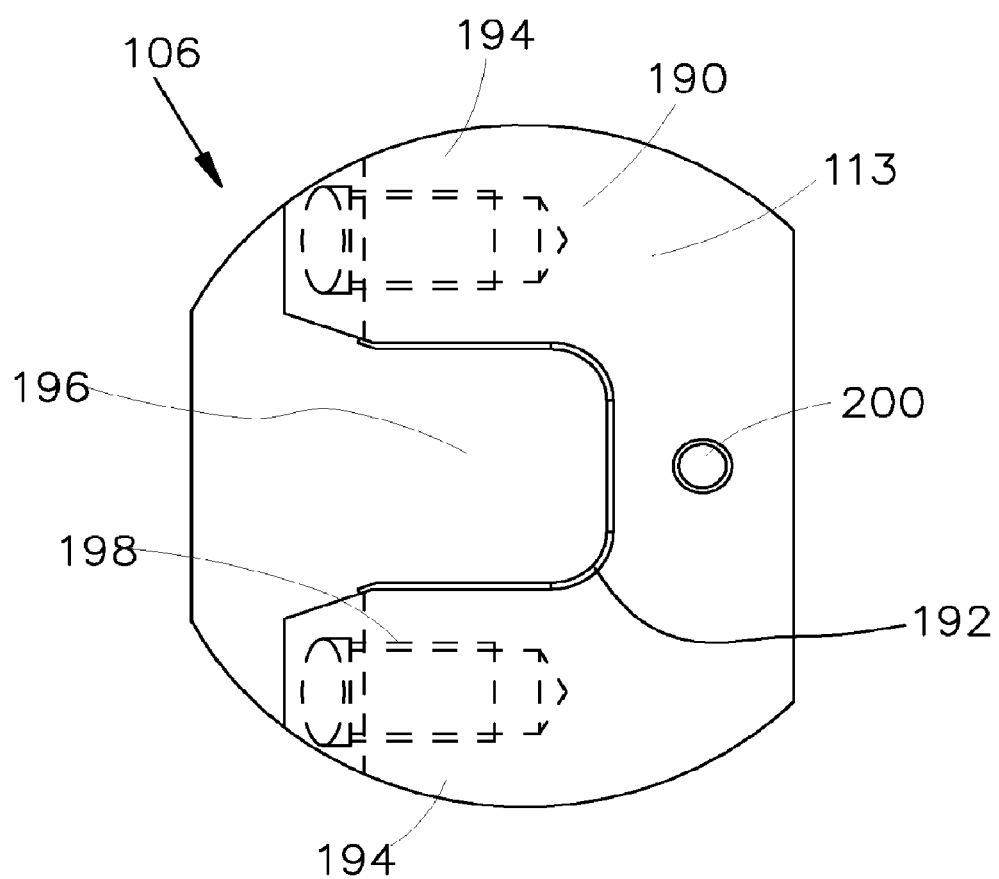

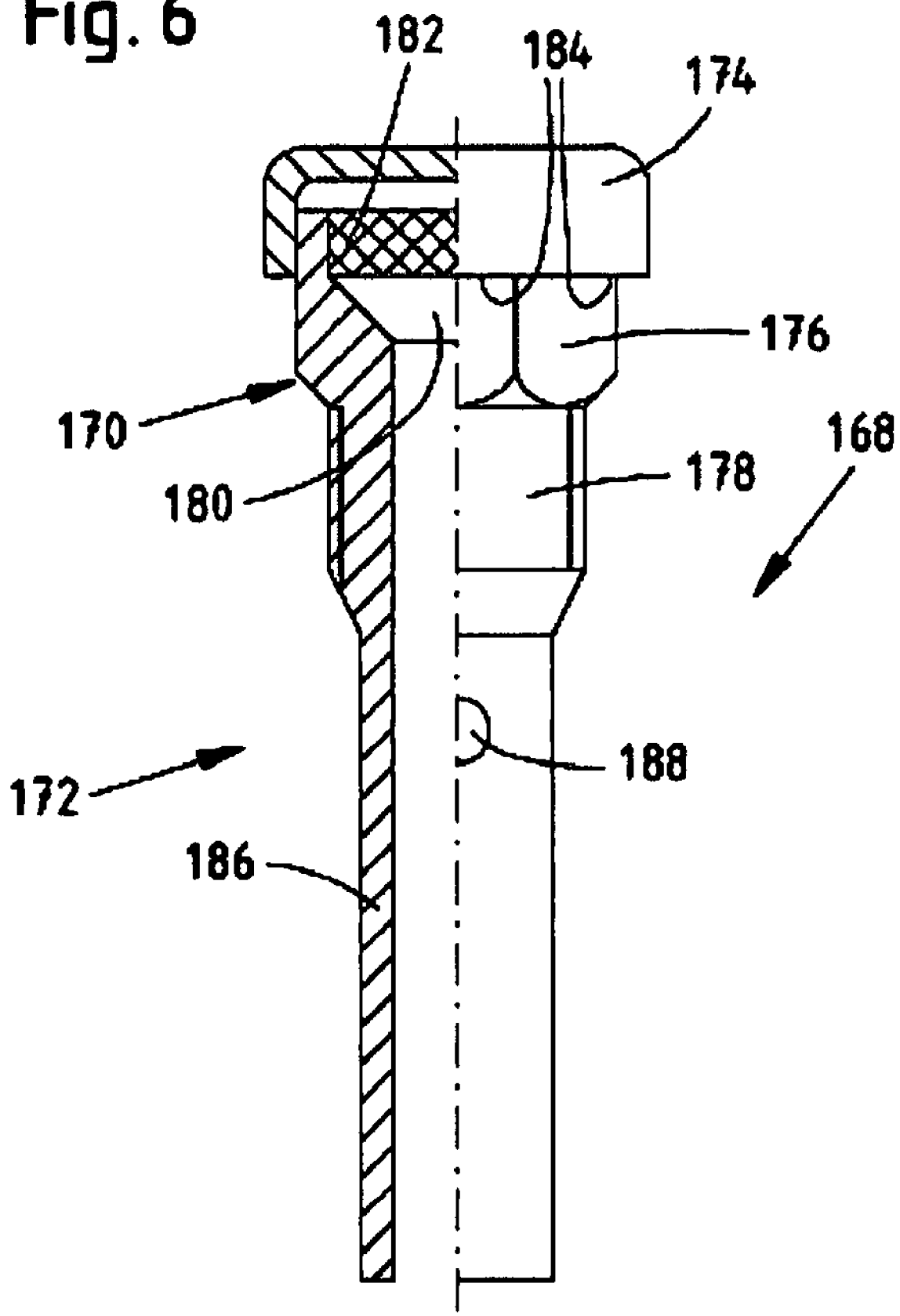

Figure 1:
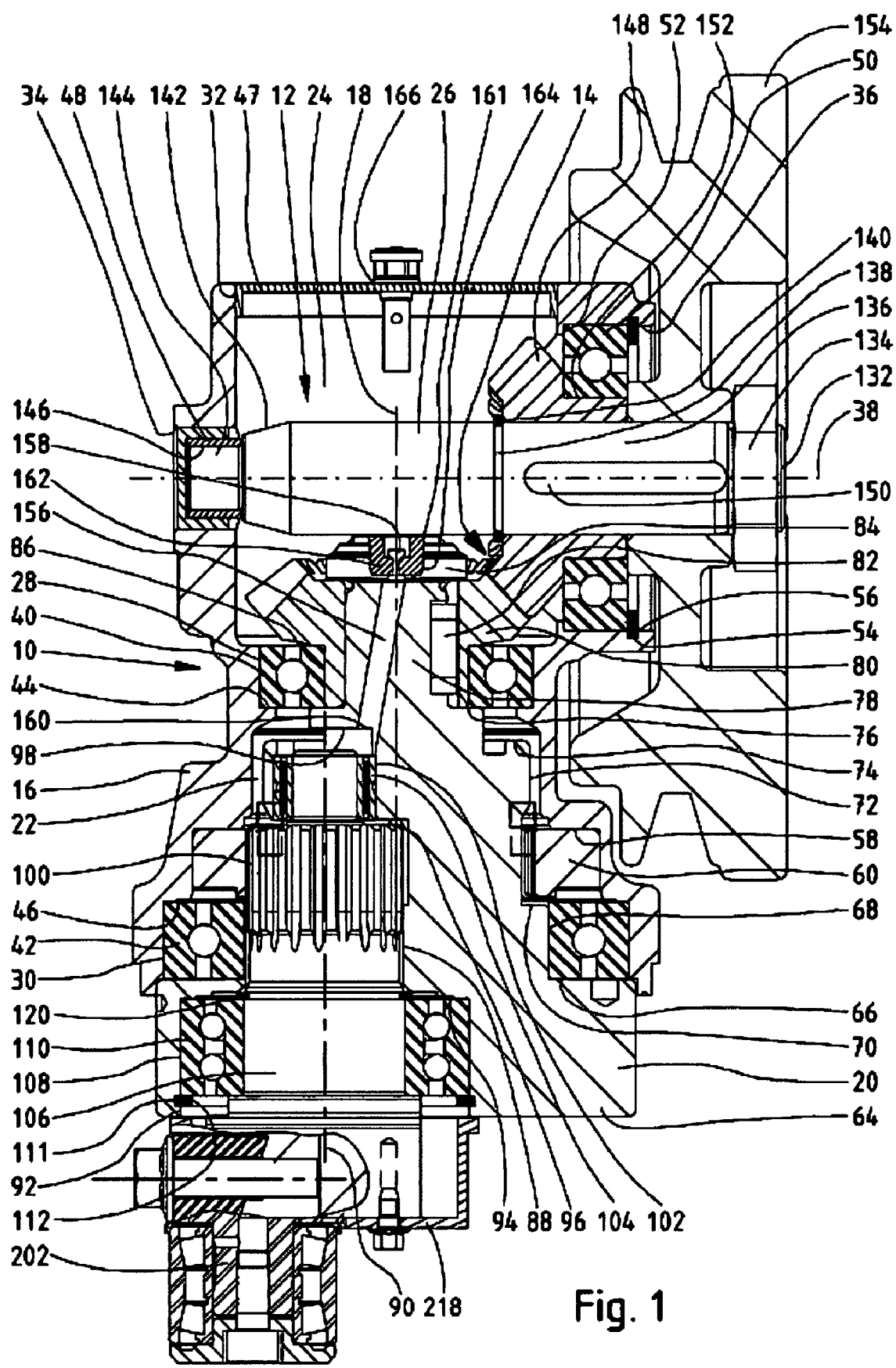

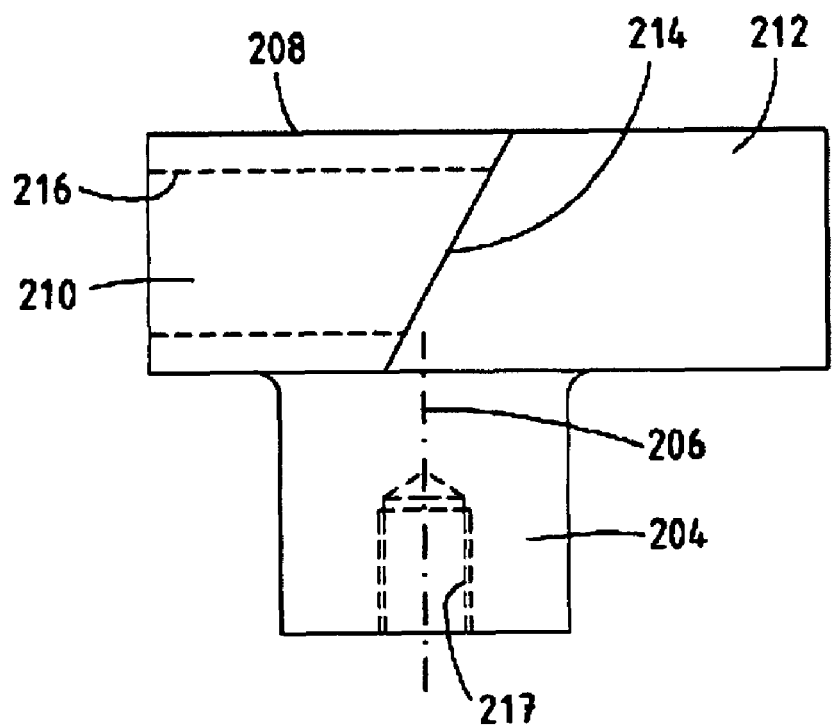
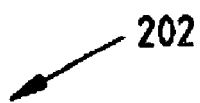
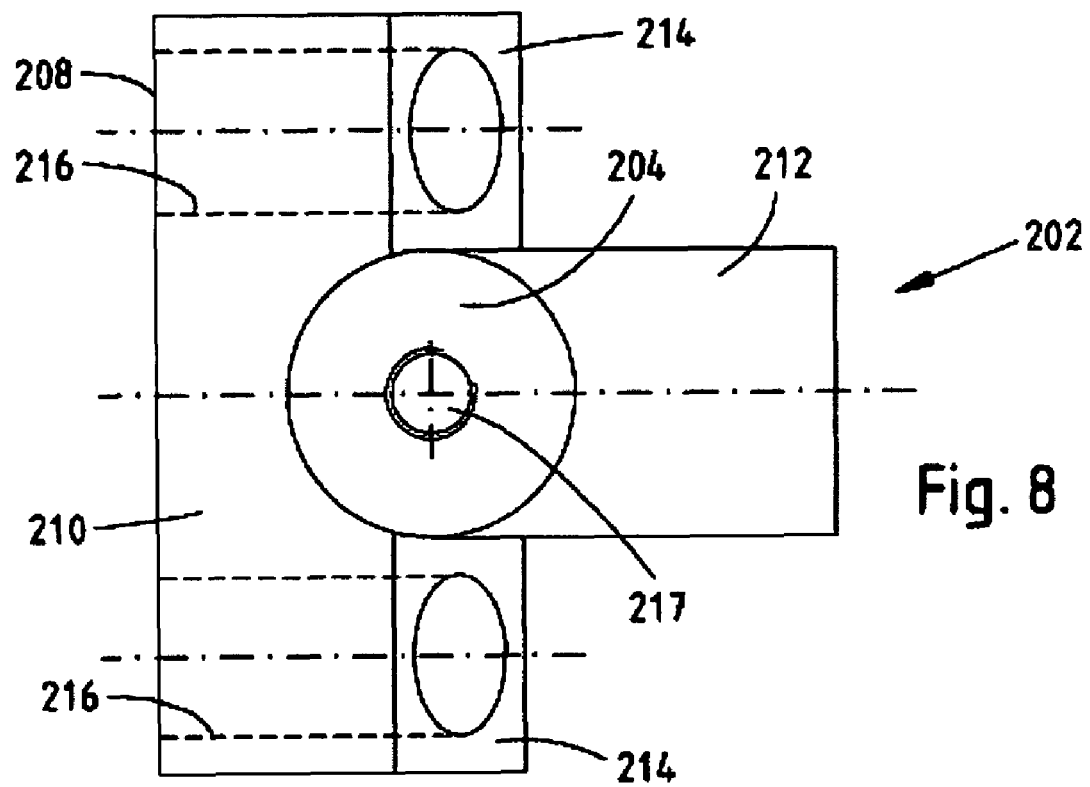

TANSMISSION ARRANGEMENT

The invention pertains to a transmission arrangement with a transmission housing, a transmission chamber surrounded by the transmission housing, a first shaft mounted in the transmission housing, a cavity formed in the first shaft eccentrically to the rotational axis with the cross-sectional center of gravity thereof, and a channel formed in the first shaft and connecting the transmission chamber to the cavity of the shaft.

In known transmission arrangements according to the prior art, transmission gear stages are arranged relative to one another at an angle and feature transmission shafts arranged within one another. Transmission arrangements with transmission shafts arranged one within another make it possible to realize a compact design and represent, among other things, a possibility for embodying eccentric drives. Transmission arrangements with an eccentric drive are used, for example, in the agricultural industry for driving cutting units on combine attachments for combine harvesters.

A transmission arrangement of this type is disclosed, for example, in U.S. Pat. No. 6,273,214 B1. This publication describes a transmission arrangement with a supply system for lubricant. The transmission arrangement features a transmission housing with a transmission shaft arranged therein. This transmission shaft can be driven by means of an angular gear stage and features an eccentrically positioned cavity. A cam shaft with a journal connected journal is arranged in the cavity. In order to ensure that the cavity is supplied with a sufficient quantity of lubricant, a channel is provided that connects a region of the transmission housing with the cavity of the shaft. Lubricant deposited in the transmission chamber can be admitted into the cavity through the channel. This transmission arrangement is furthermore provided with a ventilating device. The problem in this respect can be seen in that the lubricant must be replenished after only relatively few hours of operation so that the maintenance intervals are relatively short. In addition, the disclosed transmission arrangement has a complicated and costly design with a broad variety of parts.

The invention is based on the objective of disclosing a transmission arrangement of the initially cited type that makes it possible to overcome one or more of the aforementioned problems.

According to the invention, this objective is realized with the characteristics of Claim 1. Advantageous embodiments and additional developments of the invention are disclosed in the subordinate claims.

According to the invention, a transmission arrangement of the initially cited type is realized in such a way that the channel is provided with a component that reduces the passage cross section of the channel. The component for reducing the passage cross section of the channel may consist, for example, of a nozzle or diaphragm with a cross-sectional opening that is smaller than the passage cross section of the channel. The component may be arranged in an opening or within the channel in this case. It would also be conceivable to position the component in the channel such that it can be adjusted, for example, with the aid of threads extending through the entire channel.

The channel serves for supplying the cavity of the first shaft with lubricant deposited in the transmission chamber. To this end, the channel features a transmission chamber opening that is arranged concentrically to the rotational axis of the first shaft and a cavity opening that is arranged eccentrically relative to the rotational axis of the first shaft. Due to the centrifugal forces occurring during the rotation of the first shaft, the eccentrically arranged cavity opening generates suction in the direction of the cavity opening such that lubricant located at the transmission chamber opening or in the channel is transported to the eccentrically positioned cavity opening. The component for reducing the passage cross section of the channel is preferably arranged at the transmission chamber opening. The cross-sectional opening of the component has such dimensions that only a predetermined quantity of lubricant deposited in the transmission chamber is transported into the channel and therefore into the cavity. Depending on the arrangement of the component, it is possible to promote a pressure or suction effect for respectively pressing or drawing the lubricant through the cross-sectional opening of the component.

The transmission chamber opening is preferably provided with threads, wherein the component is realized in the form of a plug provided with external threads and a bore, for example, a bolt. Here, the bore represents the opening that reduces the cross section and makes it possible to meter a predetermined quantity of lubricant. For example, it is possible to utilize commercially available screws with a hexagonal recessed hole provided with a bore that extends along the longitudinal screw axis. An easily accessible and simple installation of the plug is ensured with the threads on the transmission chamber opening of the channel. The size or diameter of the bore provided in the plug is adapted to the output of the transmission arrangement such that the lubricant supply for the transmission arrangement can be adapted to the respective requirements. It is possible to prevent an excessive as well as an inadequate lubricant supply such that the maintenance intervals can be extended and the operating time of the transmission arrangement is prolonged. It is also possible to utilize a hex-head screw or a different type of screw instead of the screw with a hexagonal recessed hole. The component realized in the form of a plug may consist of a sleeve, bushing, tube or the like and not only consist of a metal, but also of plastic or ceramic material.

The transmission chamber is connected to the surroundings of the transmission housing by means of a ventilating device provided on the transmission housing, for example, a ventilation. opening, a ventilation tube, a ventilating valve or pressure relief valve or the like arranged on a transmission housing cover. The connection with the surroundings makes it possible to realize pressure compensation between the transmission chamber and the surroundings such that the operating temperatures are also reduced and the operating time is prolonged.

The ventilating device may be realized in the form of a pipe construction that extends through a bore in the transmission housing or transmission housing cover, respectively, wherein the ventilating device features, for example, a head and a pipe section that protrudes into the transmission chamber. The head is realized, for example, in the form of a hex-head screw that features a cavity. A filter element for filtering the air admitted into the transmission chamber is provided in the cavity of the head. The pipe section that protrudes into the transmission chamber borders on the end of the head. The hex-head preferably is at least partially covered with a circular cap. Air can be admitted and vapor can escape through the cavities formed between the edges of the hex-head and the cap. This makes it possible to transport air cleaned by means of the filter element into the interior of the transmission arrangement. In addition, lubricant vapor can be released from the transmission chamber into the surroundings filtered. The cap protects the filter element and is easily accessible and can be easily exchanged for maintenance purposes. In this case, the cap only covers the hex-head to such an extent that a sufficient area for attaching the corresponding tool remains uncovered. This ensures a simple installation/removal of the ventilating device such that the bore in which the ventilating device is accommodated can also be used, for example, as a lubricant replenishment opening during maintenance procedures. Fine-mesh wire screens may be used, for example, as filter elements. However, it would also be possible to utilize filter elements of plastic, cellulose or paper. The pipe section may be realized in the form of a simple cylindrical tube that is connected to the head, for example, by means of soldering, welding or a threaded connection.

The pipe section has a length that amounts to a multiple of the diameter of the head, e.g., five-times or more the diameter of the head, such that the pipe section protrudes as deep as possible into the transmission housing and the path to the filter element through the pipe section is as long as possible. This means that the smallest quantity of lubricant or lubricant vapor possible reaches the filter element from the transmission chamber. The length of the pipe section here preferably also amounts to a multiple of its own diameter.

The pipe section is provided with a bore in its wall. The bore preferably extends radially relative to the longitudinal axis of the pipe section and is arranged in an upper region toward the head, preferably in the upper third of the pipe section. The bore serves for enabling lubricant accumulating in the interior of the pipe section to escape before it reaches and soils the filter element. This would lead to shorter maintenance intervals. In this respect, it would be conceivable to provide the wall with several outlet bores or other openings, for example, slots. A ventilating device realized in the form of a pipe construction of the above-described type can be considered as an independent invention.

A second shaft is rotatably arranged in the cavity of the first shaft. The second shaft is preferably realized in one piece and features at least a first and a second support region, a geared region and a shaft end region that axially protrudes from the cavity of the first shaft. Connecting elements are eliminated because the second shaft is realized in one piece and the shaft end region, in particular, forms part of the shaft. This reduces susceptibility to defects and simplifies the manufacturing process and assembly. The second support region is preferably arranged between the geared region and the shaft end region. The second shaft can be supported on two bearing seats that are axially separated in the cavity of the first shaft. The first support region of the second shaft is preferably equipped with a rolling bearing, particularly a needle bearing, wherein the first bearing seat is preferably arranged in the region of the cavity opening of the channel in the transmission interior of the first shaft. A compact design can be achieved due to the relatively small dimensions of a needle bearing. A second bearing seat for a second rolling bearing is preferably arranged on a cavity opening situated on the outside of the first shaft. The second rolling bearing is realized, for example, in the form of a ball bearing and receives the second support region of the second shaft. It would naturally be conceivable to realize different combinations with other types of rolling bearings. It would furthermore be conceivable to arrange the support regions directly adjacent to one another such that the shaft end region as well as the geared region are supported in cantilevered fashion. The second shaft is preferably realized so that the maximum outside diameters of the second shaft increase in the individual regions toward the shaft end region. This results in a shaft end region of relatively large diameter, wherein a shaft shoulder toward the shaft end region serves for axially securing the second rolling bearing. This furthermore allows simple pre-installation of the second rolling bearing on the shaft so that the insertion of the second shaft can be carried out in one step and, in particular, the installation times and maintenance times for the transmission arrangement can be shortened.

The geared region realized between the at least one support region and the shaft end region meshes with gearing that is connected to the transmission housing without rotational play, preferably an internal gear. To this end, the cavity of the first shaft is provided with a radially oriented opening that extends over part of the circumference of the first shaft and partially exposes the geared region. The meshing between the geared region and the gearing that is connected to the transmission housing without rotational play makes it possible to realize an auto-rotation of the second shaft in the cavity of the first shaft such that an eccentric movement of the second shaft about the rotational axis of the first shaft can be superimposed with a rotational movement of the second shaft about its own rotational axis.

The shaft end region of the second shaft features connecting means that serve for equipping the second shaft with a journal. A flange connection that features radially extending threaded bores and that can be connected to a complementary flange connection on the journal is preferably arranged on the exposed end surface of the shaft end region. The radially extending bores make it possible to connect or install the journal from the radial direction. However, it would also be conceivable to arrange a flange provided with axially oriented threaded bores on the shaft end region, wherein this flange can be connected to a corresponding counter flange of the journal. The connecting means could conceivably also consist of a journal receptacle, for example, a bearing bushing or a collar that is correspondingly fitted into the shaft end region and receives the journal of the device to be driven.

A gap is formed between the second shaft and the second bearing seat. The shaft end region of the second shaft features a cap that makes it possible to cover the gap. The cap may be realized in the form of a pot that is placed over the shaft end region and fixed thereon, wherein the edge of the pot features a radially extending crown of such dimensions that the gap is covered by the crown over the entire circumference. The covering of the gap prevents dirt particles from being admitted into the interior of the cavity of the second shaft. The cap preferably features an opening through which the connecting means for connecting the shaft end region to another component can be accessed. In this respect, it would also be conceivable to replace the cap with an annular wheel that covers the gap and is fixed on the first shaft. A second shaft that is realized in the above-described fashion and provided with a cap can be considered as an independent invention.

The transmission arrangement features a third shaft that is supported in the transmission housing and the rotational axis of which forms an angle with a plane that lies on the rotational axis of the first shaft. The third shaft is preferably arranged such that the rotational axes of the first and the third shaft have a point of intersection and therefore lie on a common plane, wherein said rotational axes form an angle of approximately 90°. However, it would also be possible to offset the third shaft such that the rotational axes of the first and the third shaft do not lie in a common plane. It would furthermore be possible to arrange the shafts at a larger or smaller angle relative to one another.

The third shaft is preferably supported with axial play by means of a first bearing, wherein the first bearing of the third shaft is realized in the form of a roller bearing, particularly a needle bearing. In this case, it would also be possible to utilize different types of rolling bearings, for example, a ball bearing that is axially fixed in both directions on the shaft or in a bearing seat and supports the shaft with axial play. The utilization of a movable bearing in the form of a needle bearing provides the advantage that the shaft can be realized very compactly and simply.

The third shaft preferably is axially fixed in both directions on the transmission housing by means of a second bearing. The second bearing of the third shaft is preferably realized in the form of a rolling bearing, particularly a ball bearing that is axially fixed inwardly relative to the transmission housing by a shoulder on the transmission housing, and axially fixed outwardly relative to the transmission housing by means of a snap ring on the transmission housing. The fixing in the outward direction of the transmission housing by means of a snap ring allows a corresponding pre-installation and insertion of the third shift into the transmission housing. This makes it possible to reduce installation and maintenance times.

The transmission arrangement features a gearwheel that is arranged on the third shaft and axially fixed on the shaft in one direction only by means of a snap ring. The use of a snap ring for fixing the gearwheel eliminates the need for a shoulder on the shaft, which is difficult to produce. This makes it possible to realize the entire shaft more simply and therefore to reduce the manufacturing costs.

A gearwheel fixed on the first shaft meshes with the gearwheel fixed on the third shaft, wherein the gearwheel of the first shaft is fixed radially relative to the rotational axis of the first shaft in a first bearing of the first shaft and exerts an axial force with respect to the third shaft. The third shaft is axially fixed in both directions by the axial force and the snap ring for the second bearing of the third shaft that is arranged on the transmission housing. A third shaft that is realized as described above can be considered as an independent invention. In addition, the arrangement of three shafts as described above and particularly in the manner of supporting and fixing the shafts can also be considered as an independent invention.

The transmission arrangement preferably features a journal that extends from the shaft end region axially and eccentrically relative to the rotational axis of the second shaft. The rotation of the first and the second shaft results in a superposition of an eccentric rotational movement of the rotational axis of the second shaft about the rotational axis of the first shaft with an additional eccentric rotational movement of the journal about the rotational axis of the second shaft. Here, the journal serves for converting the superimposed eccentric movements into corresponding linear movements of a device to be driven, for example, a cutting unit.

The journal preferably features connecting means that can be connected to the connecting means of the shaft end region. Thus, the journal must be provided with a flange connection that is realized complementarily to the flange connection of the shaft end region such that the flange connections of to shaft end region and of the journal are adapted to one another.

In order to transmit the rotational movements, the journal is preferably provided with a rolling bearing that can be connected by means of a step bearing connected in turn to the device to be driven. Depending on the rotational speed of the journal and the shafts and on the forces to be transmitted, it would also be possible to replace the rolling bearing with a sliding bearing, for example, in the form of a sliding bushing.

The rolling bearing of the journal is preferably realized in the form of a roller bearing, wherein the outer race of the roller bearing is accommodated in a bushing that is preferably realized annularly and has a spherically curved outer surface. The spherically curved outer surface is accommodated in a step bearing with an inner surface that is realized congruently to the outer surface of the bushing. The spherical surfaces allow a relative movement so that an angle of inclination can be adjusted between the journal and the device to be driven and between the longitudinal journal axes and the rotational axis of symmetry of the step bearing, respectively, and tolerance problems in the transmission of movements can be overcome. It is furthermore possible to realize the rolling bearing in the form of a ball bearing, the outer race of which is accommodated in a corresponding bushing.

The bushing that accommodates the outer race as well as the step bearing surrounding the bushing are realized with a closed circumference. The step bearing contains recesses or openings that lie radially opposite one another and extend along the inner surface of the step bearing axially referred to the rotational axis of symmetry of the step bearing. The openings are dimensioned such that the bushing can be inserted widthwise transverse to its rotational axis of symmetry and turned 90° in order to align the outer surface of the bushing with the inner surface of the step bearing and thereby move the bushing into the support position. Embodiments known thus far feature a bushing that is circumferentially open or slotted and usually consists of plastic, wherein a bushing of this type is accommodated in an open step bearing. The slotted bushing is tensioned around the rolling bearing of the journal with the aid of a tensioning device arranged on the step bearing. Since the bushing and the step bearing are closed over their circumference, the connection of the rolling bearing with the bushing and with the step bearing can be produced without complicated tensioning devices. In addition, it is possible to utilize rigid materials that are more resistant to wear such that the maintenance intervals are extended and susceptibility to defects is reduced. These measures furthermore result in less bearing play. A transmission arrangement with a rolling bearing for the journal that is realized in the above-described fashion by means of a closed bushing and a closed step bearing with spherical surfaces can be considered as an independent invention.

In an alternative embodiment, the rolling bearing for the journal is realized in the form of a needle bearing. In this case, it is preferred to utilize a needle bearing with an outer race that has a spherically curved outer surface. In this case, it would also be possible to utilize a different type of rolling bearing, for example, a ball bearing or roller bearing that is provided with a correspondingly shaped outer race.

In the alternative embodiment, the rolling bearing for the journal or the needle bearing preferably features an outer race with an inner surface that is spherically curved congruently to the outer surface of the outer race, wherein the race is accommodated by the outer ring and the outer ring of the needle bearing is supported in a step bearing. In this case, the outer ring preferably has a cylindrical outer surface that is accommodated by a step bearing, the inner surface of which is also realized cylindrically. A step bearing with a cylindrical inner surface can be inexpensively manufactured in the form of a step bearing with a spherically curved inner surface. However, an outer ring with a cylindrical outer surface and a step bearing with a cylindrical inner surface are preferably provided with a clamping device that holds the outer ring in the step bearing. A transmission arrangement with a needle bearing for the journal that features an outer race and an outer ring of the above-described type and is combined with a corresponding step bearing can be considered as an independent invention.

The step bearing for the rolling bearing of the journal is preferably connected to connecting means, particularly connecting means for producing a connection with a cutting unit. For example, the step bearing is directly connected to a motion link or a connecting rod that causes a cutting movement. The connection with the step bearing can be produced, for example, by means of welding or a screw connection. It is furthermore possible to realize the step bearing and the connecting means in one piece, for example, by means of forging or casting.

The invention as well as advantages and advantageous additional developments and its embodiments are described in greater detail below with reference to the drawings that shows an embodiment of the invention.

Figure 2:
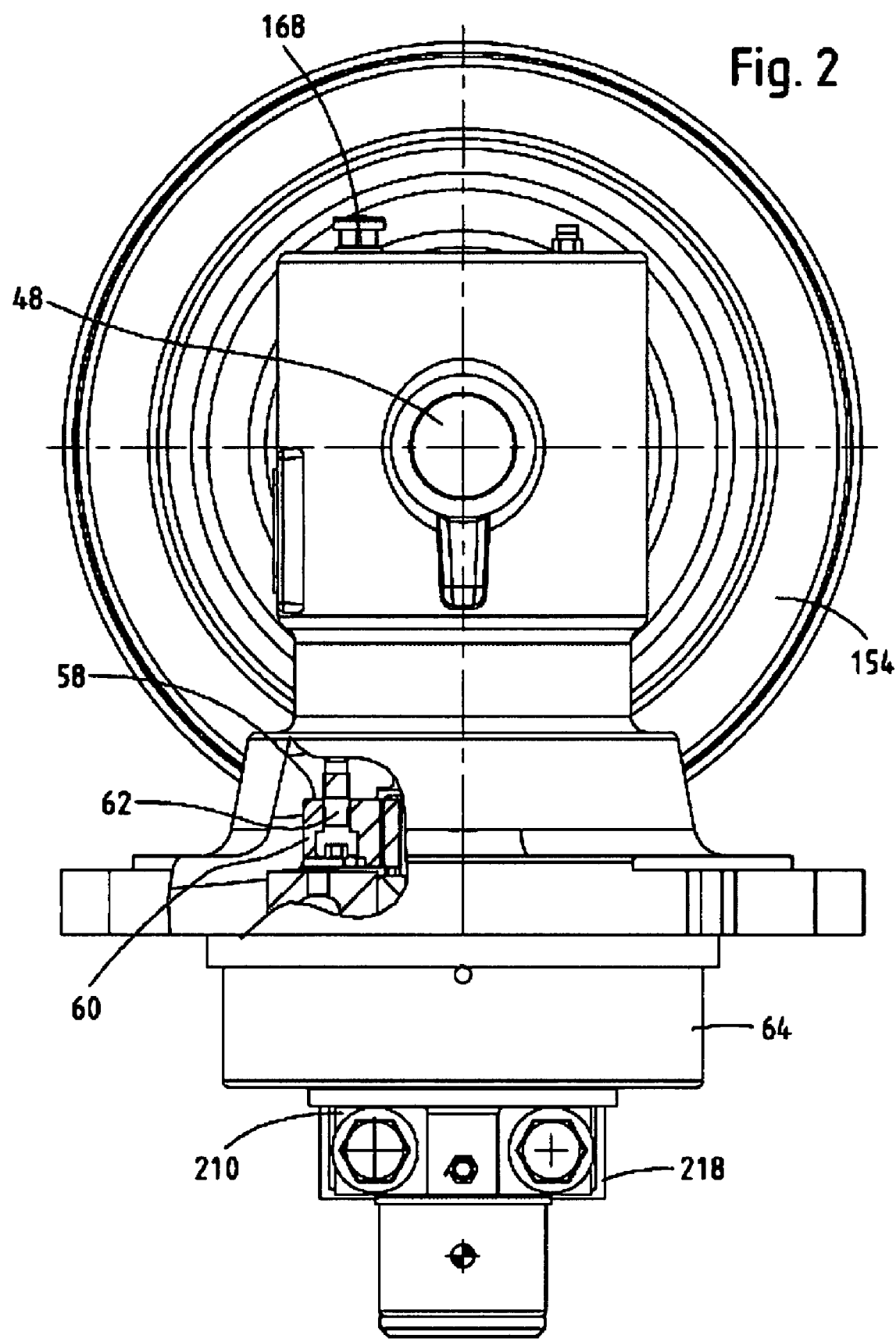
Figure 3:
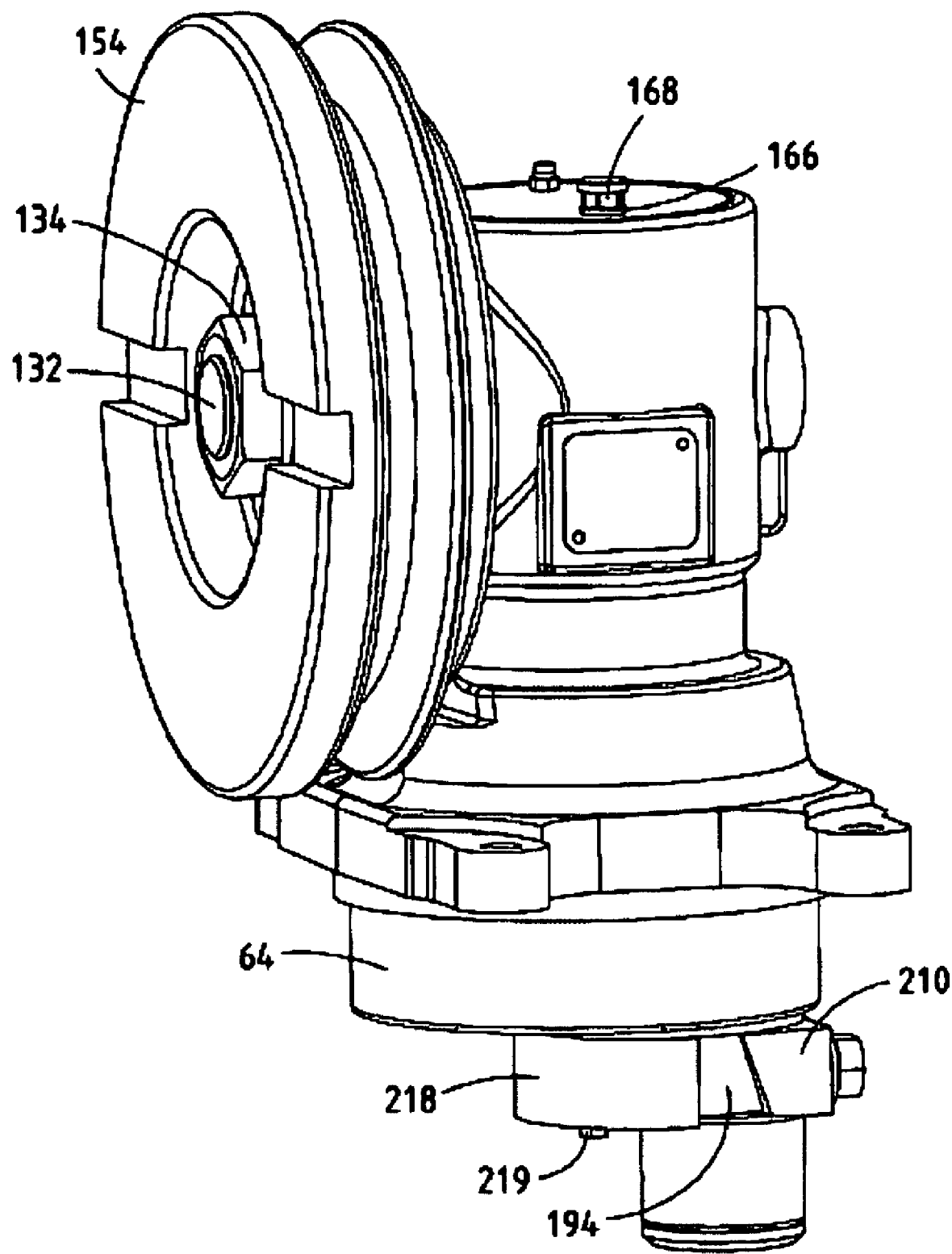
Figure 4:
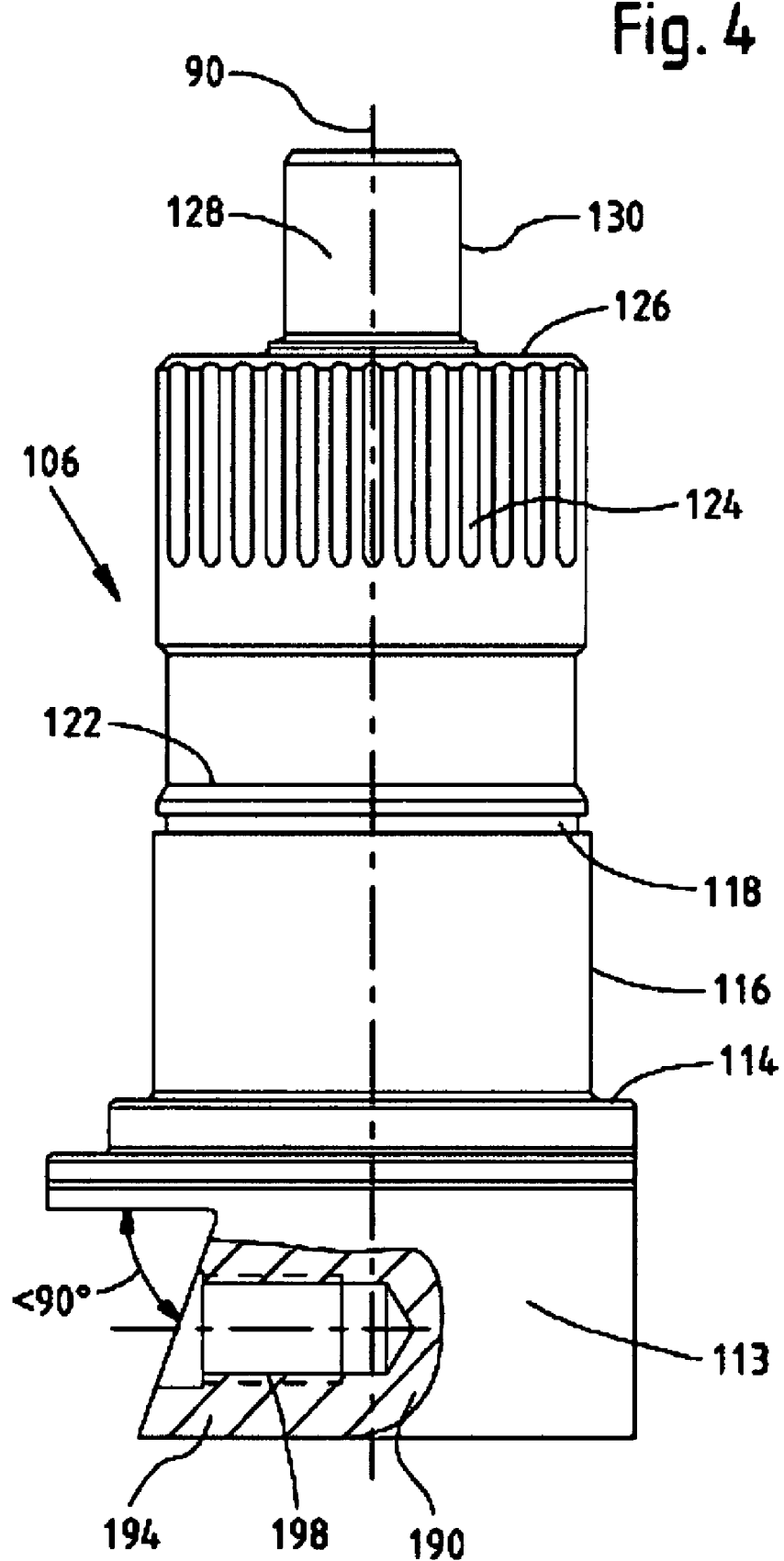
Figure 9:
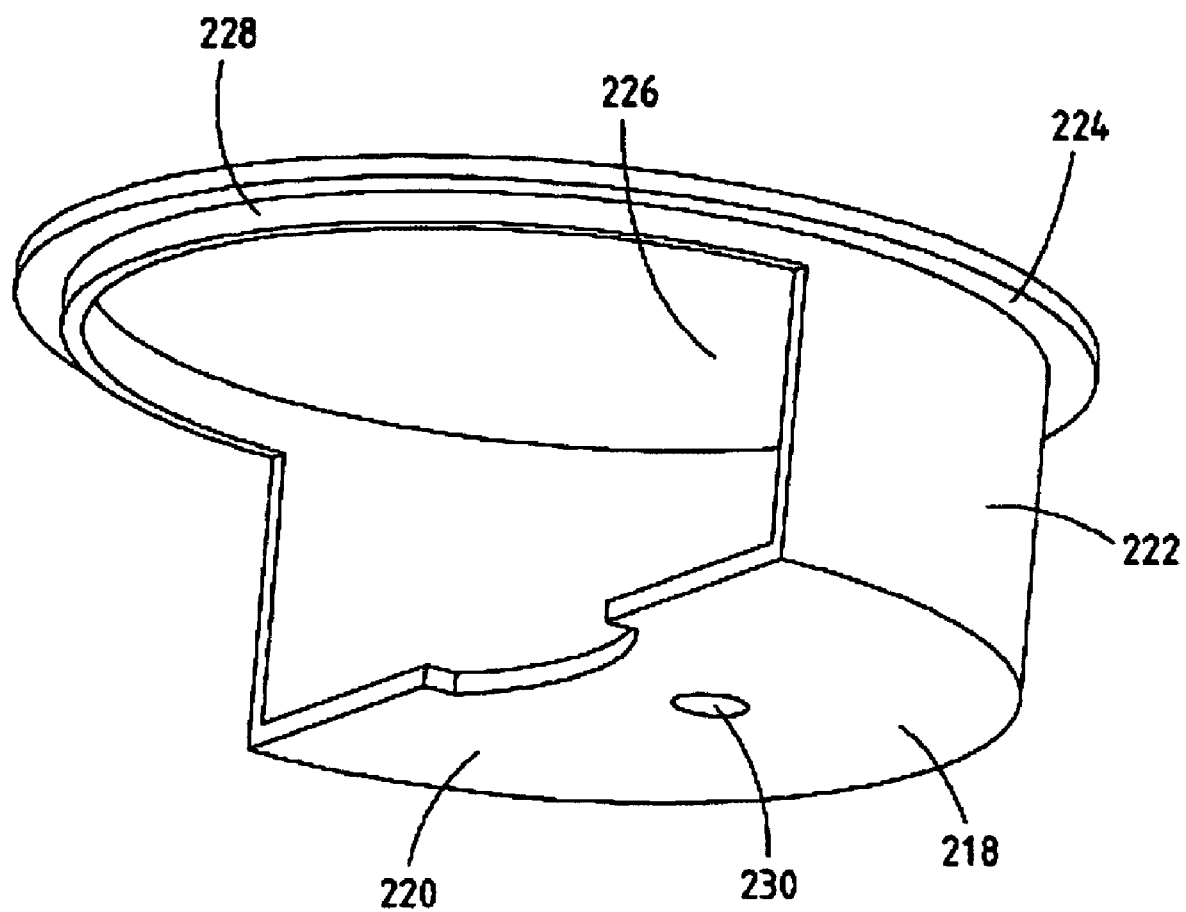
Figure 10:
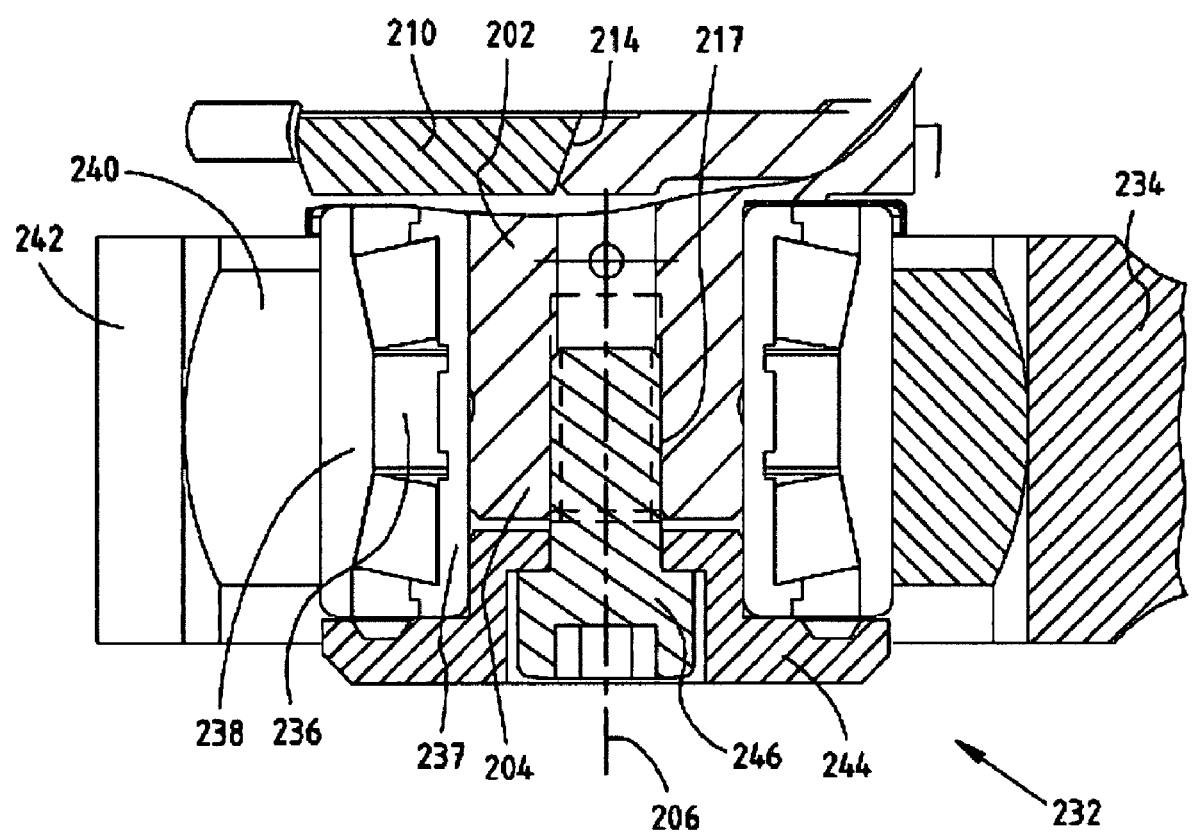
Figure 11:
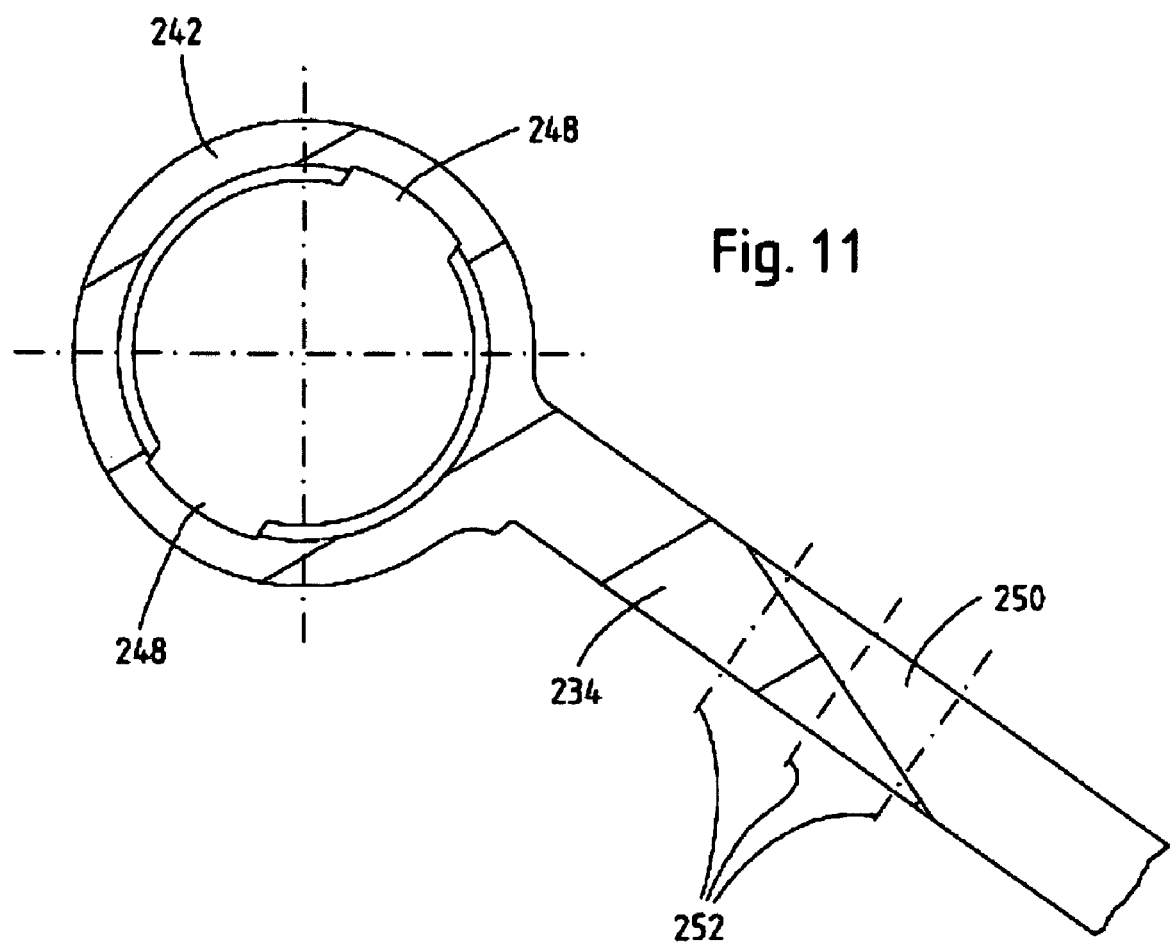
Figure 12:
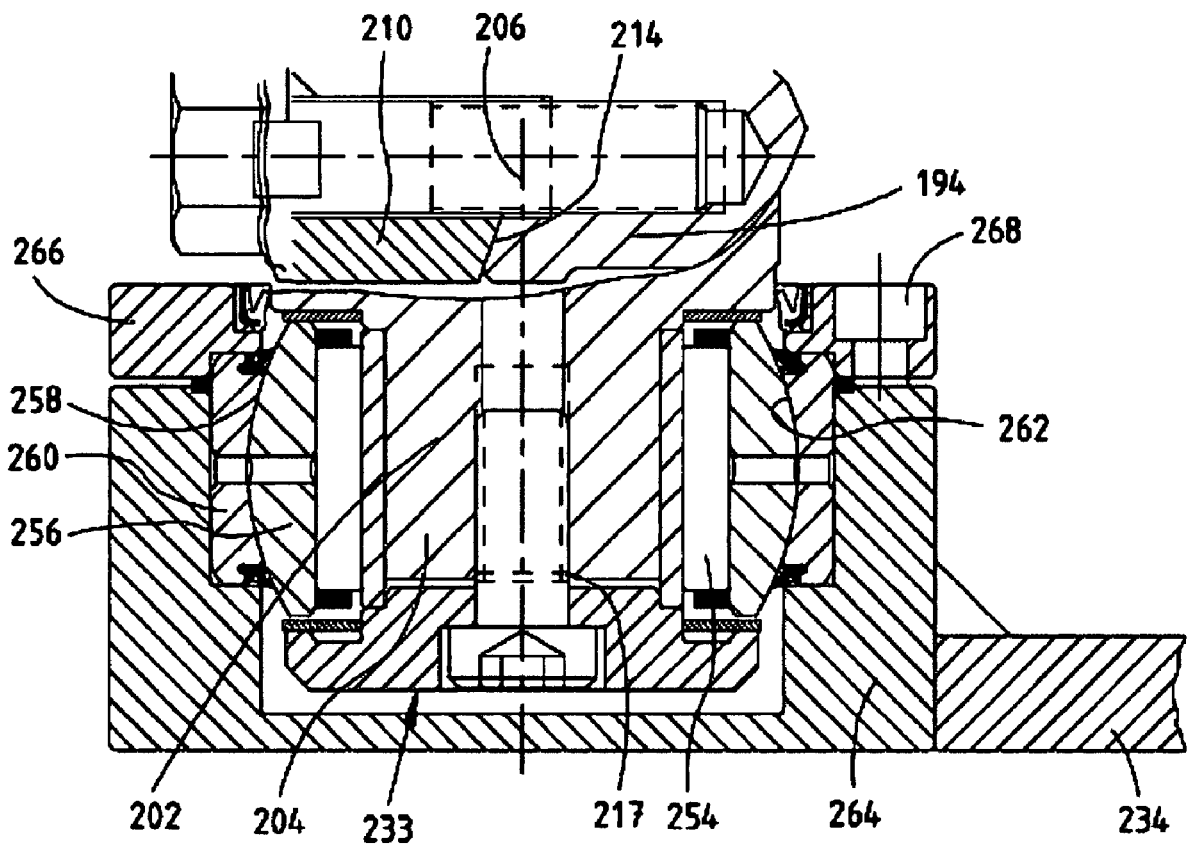

It shows:

FIG. 1, a cross-sectional representation of a transmission arrangement of the invention FIG. 2, a side to view of the transmission arrangement according to FIG. 1;

FIG. 3, a perspective side view of the transmission arrangement according to FIG. 1;

FIG. 4, a detail of a second shaft of the transmission arrangement according to FIG. 1;

FIG. 5, a top view of a shaft end region of the second shaft according to FIG. 4;

FIG. 6, a partial cross section through a ventilating device of the transmission arrangement according to FIG. 1;

FIG. 7, a side view of a journal configuration of the transmission arrangement according to FIG. 1;

FIG. 8, a top view of the journal arrangement according to FIG. 7;

FIG. 9, a perspective side view of a cap of the transmission arrangement according to FIG. 1;

FIG. 10, a cross-sectional representation of a bearing arrangement for a journal of the transmission arrangement according to FIG. 1;

FIG. 11, a cross-sectional representation of a step bearing with connecting means for the bearing arrangement according to FIG. 10, and FIG. 12, a cross-sectional representation of an alternative embodiment of a bearing arrangement for a journal of the transmission arrangement according to FIG. 1.

FIGS. 1-3 show a transmission arrangement 10 of the invention with a transmission housing 16 that surrounds a transmission chamber 12 of an angular transmission 14. The transmission housing 16 essentially extends along the rotational axis 18 of a first shaft 20 in a rotationally symmetrical fashion, wherein the rotational axis 18 defines a longitudinal direction of the transmission arrangement 10. The transmission chamber 12 is divided into a first transmission chamber area 22 that essentially surrounds the first shaft 20 and a second transmission chamber area 24 that essentially surrounds a third shaft 26 arranged transverse to the longitudinal direction. The transmission chamber areas 22, 24 border on one another in the longitudinal direction and feature a common cylindrical transition area 28 that is arranged approximately centrally in the longitudinal direction of the transmission housing 16 and coaxial to the rotational axis 18, wherein an axial connection between the transmission chamber areas 22, 24 is defined by said transition area.

In the first transmission chamber area 22, the transmission housing 16 contains a first cylindrical opening 30 that is aligned coaxial to the rotational axis 18 and opens the first transmission chamber area 22 axially outward. The transmission housing 16 furthermore features second, third and fourth cylindrical openings 32, 34, 36 in the second transmission chamber area 24. The second opening 32 is aligned coaxially to the rotational axis 18 and opens the second transmission chamber area 24 axially outward. The third and the fourth opening 34, 36 are arranged on both sides of the rotational axis 18 and coaxial to a rotational axis 38 of the third shaft 26 that is arranged transverse to the rotational axis 18.

A first bearing 40 for the first shaft 20 is arranged in the common transition area 28 and a second bearing 42 for the first shaft is arranged in the first opening 30 within the first transmission chamber area 22. The common transition area 28 features a shoulder 44 that axially fixes the bearing 40 in the direction of the first opening 30. A shoulder 46 is realized on the first opening 30 in order to axially fix the bearing 42 in the direction of the common transition area 28. The bearings 40, 42 are preferably realized in the form of rolling bearings and are illustrated in the form of examples as ball bearings in FIG. 1. The bearings 40, 42 receive and rotatably support the first shaft in the transmission housing 16 and in the first transmission chamber area 22, respectively.

A housing cover 47 that axially delimits the second transmission chamber 24 relative to the surroundings is provided on the second opening 32 within the second transmission chamber area 24.

A first bearing 48 for the third shaft 26 is arranged in the third opening 34 and a second bearing 50 for the third shaft is arranged in the fourth openings 36 within the second transmission chamber area 24. The fourth opening 36 features a shoulder 52 that axially fixes the bearing 50 in the direction of the third opening 34. The fourth opening 36 furthermore features an annular groove 56 that is provided with a snap ring 54 so that the bearing 50 is also axially fixed in the opposite direction. The bearing 48 is arranged in the third opening 34 so that it is supported in cantilevered fashion. The bearings 48, 50 are preferably realized in the form of rolling bearings, wherein a roller bearing in the form of a needle bearing is used as the bearing 48 as shown in FIG. 1. Although the bearing 50 is realized in the form of a ball bearing in the embodiment shown, it would also be possible to use here a roller thrust bearing. The bearings 48, 50 receive and rotatably support the third shaft in the transmission housing 16 and in the second transmission chamber area 24, respectively.

In addition, another shoulder 58 is provided between the bearings 40, 42 in the first transmission chamber area 22, wherein an internal gear 60 is fixed on said shoulder. The internal gear 60 is screwed to the transmission housing 16 by means of bolts 62 distributed over the circumference of the shoulder 58 (see FIG. 2).

The first shaft 20 extends through the entire first transmission chamber area 22 and features a shaft end region 64 that protrudes from the first opening 30 and essentially covers the entire diameter of the first opening 30. The shaft end region 64 features a first shaft shoulder 66 that is followed by a support region 68 for the second bearing 42. A second shaft shoulder 70 is arranged adjacent to the support region 68 and followed by a central shaft region 72. The central shaft region 72 ends in a third shaft shoulder 74. The third shaft shoulder 74 is followed by a fourth shaft shoulder 76, which, in turn, is followed by a shaft journal 78, where the shaft journal 78 extends through the common transition area 28 and into the second transmission chamber area 24. A first bevel gear 80 is supported on the shaft journal 78 and connected without rotational play to the first shaft 20 and the shaft journal 78, respectively, by means of a tongue-and-groove connection 82. The shaft journal 78 is provided with a shaft nut 84. A support region 86 realized on the first bevel gear 80 accommodates the first shaft 20 in the first bearing 40.

The first shaft 20 is provided with a cavity 88. The cavity 88 is essentially realized cylindrically about a rotational axis 90, wherein the rotational axis 90 is arranged parallel to the rotational axis 18 and eccentrically to the first shaft 20. The cavity 88 contains a cylindrical opening 92 that axially opens the cavity 88 relative to the rotational axis 90, toward the shaft end 64 of the first shaft 20. Beginning at the opening 92, the cavity 88 features first and second shoulders 94, 96 and ends in a cavity bottom 98. Between the first and second shoulders 94, 96, the cavity 88 is provided with an opening 100 at the height of the internal gear 60, wherein said opening extends along the cavity wall radially and axially relative to the rotational axis 90 and opens a section of the cavity wall toward the internal gear 60.

A first bearing seat 102 for receiving a first bearing 104 for a second shaft 106 is realized between the second shoulder 96 of the cavity 88 and the cavity bottom 98. A second bearing seat 108 for receiving a second bearing 110 for the second shaft 106 is realized between the opening 92 of the cavity 88 and the first shoulder 94, where the second bearing seat 108 features an annular groove 111, in which a snap ring 112 for axially fixing the second bearing 110 is accommodated.

The first and the second bearing 104, 110 for the second shaft 106 are realized in the form of rolling bearings, wherein a roller bearing in the form of a needle bearing is used as the first bearing 104 and a ball bearing is used as the second bearing 110 as shown in FIG. 1.

The second shaft 106 extends through the entire cavity 88 of the first shaft 20 and features a shaft end region 113 that protrudes from the first opening 92 of the first shaft 20 (see FIG. 4). Beginning at the shaft end region 113, the second shaft 106 is provided with a first shaft shoulder 114 that this is followed by a support region 116 for the second bearing 110. An annular groove 118 for accommodating a snap ring 120 (shown in FIG. 1) is arranged adjacent to the support region 116. The annular groove 118 is followed by a second shaft shoulder 122 that ends in a region 124 of the second shaft 106. The geared region 124 of the second shaft 106 extends axially between the shoulders 94, 96 of the cavity 88 and ends in a third shaft shoulder 126. The third shaft shoulder 126 is followed by a shaft journal 128, on which a support region 130 for the first bearing 104 is realized.

The third shaft 26 extends through the entire second transmission chamber area 24 and features a shaft end region 132 that protrudes from the fourth opening 36 (see FIG. 1). The shaft end region 132 is provided with a shaft nut 134. Beginning at the shaft end region 132, the third shaft 26 features a shaft region 136 that is followed by an annular groove 138, wherein part of the shaft region 136 protrudes from the fourth opening 36. A snap ring 140 is accommodated in the annular groove 138. A shoulder 142 provided between the annular groove 138 and the third opening 34 is followed by a shaft journal 144. A support region 146 is realized on the shaft journal 144 and received by the first bearing 48 of the second transmission chamber area 24. The shaft region 136 supports a second bevel gear 148 that is connected without rotational play to the third shaft 26 by means of a tongue-and-groove connection 150. A support region 152 is realized on the second bevel gear 148 and serves for receiving the third shaft in the second bearing 50. In addition, a pulley 154 is provided on the part of the shaft region 136 that protrudes from the fourth opening 36, wherein said pulley is also connected without rotational play to the third shaft 26 by means of a tongue-and-groove connection 150.

The shaft journal 78 of the first shaft 20 is provided with a channel 156 that, beginning at the end of the shaft journal 78, features a transmission chamber opening 158 and a cavity opening 160. The transmission chamber opening 158 is arranged concentrically to the rotational axis 18 of the first shaft 20. The cavity opening 160 of the channel 156 is arranged in the region of the cavity bottom 98, eccentrically relative to the rotational axis 18 of the first shaft 20. The transmission chamber opening 158 is provided with threads 161 and a component 162, particularly a plug realized in the form of a screw with a hexagonal recessed hole. The component 162 is provided with a bore 164. The component 162 and the bore 164 are arranged concentric to the rotational axis 18.

The housing cover 47 contains a bore 166, into which a ventilating device 168 is inserted. The ventilating device 168 is realized in the form of a pipe construction and illustrated in detail in FIG. 6. The ventilating device 168 features a head 170 that is followed by a pipe section 172. The head 170 comprises a cylindrical cap 174, a screw head-shaped region 176 in the form of a hex-head and an adjacent cylindrical threaded region 178. The screw head-shaped region 176 as well as the threaded region 178 feature a cylindrical cavity 180. A filter element 182 in the form of a wire screen is embedded in the upper region of the cavity 180. The cap 174 positively encloses the screw head-shaped region 176 around the edges of the hex-head so that the cavity 180 is upwardly closed and slots 184 that are connected to the cavity 180 are formed laterally of the head 170 between the cylindrical edge of the cap 174 and the surfaces of the hex-head. The pipe section 172 comprises a cylindrical pipe 186 that has approximately the same diameter as the threaded region 178. The pipe 186 has such dimensions that its length corresponds to a multiple of the diameter. The wall of the pipe 186 is provided with a through-bore 188 in the upper region, preferably in the upper third. The pipe 186 is open toward the bottom and extends into the interior of the second transmission chamber area 24 (see FIG. 1).

The shaft end region 113 of the second shaft 106 features connecting means 190 that is realized in the form of a radially connecting flange arrangement as illustrated in FIGS. 4 and 5. The connecting means 190 comprises a U-shaped elevation 192 that axially protrudes from the shaft end region 113 of the second shaft 106 and has two legs 194 that extend transverse to the rotational axis 90 on the end surface of the shaft end region 113. A free space 196 is formed between the legs 194. The end surfaces of the legs 194 are provided with threaded bores 198, wherein the end surfaces of the legs 194 and the bottom of the free space 196 form an angle that is less than 90°. The end surface of the shaft end region 113 is provided with a threaded bore 200.

The transmission arrangement 10 is furthermore provided with a journal arrangement 202 connected to the shaft end region 113 of the second shaft 106. The journal arrangement 202 is illustrated in detail in FIGS. 7 and 8. The journal arrangement 202 features a journal 204 with a journal axis 206 and connecting means 208 in the form of a radially connecting flange arrangement. The connecting means 208 comprises a plate 210, from which a web 212 extends in the radial direction relative to the journal axis 206. The plate 210 has a height that essentially corresponds to the height of the U-shaped elevation 192. The journal 204 axially extends toward the journal axis 206 from the plate 210. The web 212 is realized so that it essentially has the shape and the size of the free space 196. Connecting surfaces 214 are realized laterally of the web 212 and beveled in accordance with the end surfaces of the legs 194. The plate 210 is provided with bores 216, the size and spacing of which are adapted to those of the threaded bores 198. The end surface of the journal 204 is furthermore provided with a threaded bore 217 that is arranged concentric to the journal axis 206.

The shaft end region is furthermore provided with a cap 218 (see FIG. 9). The cap 218 has the form of a cylindrical pot with a bottom 220, a wall region 222 and a crown 224 that radially protrudes over the wall region 222 of the cap 218. The cap 218 is provided with a cutout 226 underneath the crown 224, wherein said cutout semicircularly exposes the wall region 222 over half the circumference of the pot and the bottom 220 such that the cap 218 is merely realized in the form of a narrow residual ring 228 and the crown 224 over half the circumference in the wall region 222. The mounting bore 230 for the cap 218 is provided in the bottom 220 and serves for mounting the cap 218 in the threaded bore 200 of the shaft end region 113 of the second shaft 106 with the aid of a screw 219 (see FIG. 3).

The journal arrangement 202 or the journal 204, respectively, is provided with a bearing arrangement 232 (see FIGS. 10 and 11) that is connected to connecting means 234 for operating a (not-shown) cutting unit. The bearing arrangement 232 comprises a rolling bearing 236 with an inner race 237, an outer race 238 and a bushing 240 that is closed over its circumference and a first step bearing 242 that is closed over its circumference, wherein the first step bearing 242 produces the connection with the connecting means 234. The bearing arrangement furthermore comprises a mounting disk 244 and a mounting bolt 246. The rolling bearing 236 is realized in the form of a roller thrust bearing and accommodated by the inner race 237 of the journal 204. The bushing 240 is accommodated by the outer race 238. The bushing 240 is supported in a first step bearing 242. The bushing 240 features an outer surface that is spherically curved outward radially relative to the rotational axis 206 of the journal 204. The first step bearing 242 features an inner surface that is spherically curved inward radially relative to the rotational axis 206 of the journal 204 and realized congruent to the outer surface of the bushing 240. The first step bearing 242 features recesses 248 that lie radially opposite one another and extend along the inner surface of the bearings socket 242 axially relative to the journal axis 206. The curvatures of the spherical surfaces of the bushing 240 and the first step bearing 242 have a radius that corresponds to the maximum external radius of the bushing 240 and the maximum internal radius of the first step bearing 242. The recesses 248 serve for inserting the bushing 240 into the first step bearing 242. The connecting element 234 is realized in the form of a guide rod that is connected without rotational play to the first step bearing 242 or realized in one piece together with the first step bearing 242. The connecting means 234 are connected to a (not-shown) cutting unit mechanism by means of a connecting rod 250 and threaded connections 252.

The assembly as well as relevant advantages of the transmission arrangement 10 shown are briefly discussed below.

The transmission housing 16 is initially equipped with the internal gear 60 and with the second bearing 42 for the first shaft 20. The first shaft 20 is then installed in the first transmission chamber area 22 through the first opening 30. The first bevel gear 80 that is pre-assembled with the second bearing 40 is guided through the second opening 32 of the second transmission chamber area 24 and placed over the shaft journal 78. The bevel gear 80 and the bearing 40 are axially tensioned by means of the shaft nut 84 and the shaft shoulder 76 so that the first shaft 20 is axially secured.

The second shaft 106 is pre-assembled with the first bearing 104 and the second bearing 110, wherein the second bearing 110 is axially secured by means of a snap ring 120 in the annular groove 118. A pre-assembled second shaft 106 is inserted into the cavity 88 of the first shaft 20 and axially fixed with the aid of the snap ring 112 and the annular groove 111.

The third shaft 26 is pre-assembled in such a way that the shaft journal 144 is fitted with the first bearing 48 and the second bevel gear 148 with the pre-assembled second bearing 50 is pushed against the snap ring 140 in the annular groove 138 of the third shaft 26. The pre-assembled third shaft 26 is then inserted into the second transmission chamber area 24 through the fourth opening 36 and the second bearing 50 is axially fixed on the annular groove 56 with the snap ring 54. The pulley 154 is then guided on the shaft end 132 and pressed against the second bearing 50. The pulley 154, the second bearing 50 and the second bevel gear 148 are axially secured on the third shaft 26 with the shaft nut 134 and the snap ring 140.

The cap 218 is screwed on the protruding shaft end region 113 of the second shaft 106 in order to protect the cylindrical opening 92 of the cavity 88. The crown 224 of the cap 218 covers the entire cylindrical opening 92 and thereby prevents the entry of dirt.

The connection between the connecting means 190, 208 of the shaft end region 113 and the journal arrangement 202 is produced by inserting the web 212 into the free space 196 and screwing on the plate 210 with the legs 194 by means of the bores 198 and 216. The journal 204 is fixed eccentrically to the rotational axis 90 of the second shaft 106 by connecting the connecting means 190, 208.

The assembly of the bearing arrangement 232 and the journal 202 is realized by inserting the journal 202 into the inner race 237 of the rolling bearing 236. The bushing 240 is inserted into the recesses 244 transverse to the first step bearing 242 (such that the radii of the bushing 240 and the first step bearing 242 are positioned perpendicular to one another) until the center of the bushing lies approximately at the level of the center of the step bearing. The bushing is moved into a position in which it is axially and radially fixed relative to the rotational axis of the journal 206 by the first step bearing 242 by subsequently aligning the bushing 240 relative to the first step bearing 244 (such that the radii of the bushing 240 and the first step bearing 242 are positioned parallel to one another). However, the bushing 240 can be turned about any rotational axis that extends through the center of the first step bearing and lies perpendicular to the rotational axis 206. Subsequently, the bushing 240 is placed over the outer race 238 and the rolling bearing 236 is connected to the journal 204 together with the bushing 240 by means of the mounting disk 244 and the mounting bolt 246. The spherical design of the bushing 240 and the first step bearing 242 makes it possible for the connecting means 234 or the connecting rod 250 to carry out a compensatory movement about an axis that extends perpendicular to the rotational axis 206 of the journal 204. The closed design of the bushing 240 and the first step bearing 242 increases the stability and resistance to wear of the bearing arrangement 232. In addition, the assembly is simplified because conventional tensioning devices for the first step bearing 242 are eliminated.

The transmission arrangement 10 is driven via the pulley 154 on the third shaft 26. The first shaft is driven about the rotational axis 18 by means of the angular transmission realized with the two bevel gears 80, 148. A rotational movement of the first shaft 20 not only initiates a rotational movement of the second shaft 106 about the rotational axis of the first shaft 20, but also a self-rotation of the second shaft 106 about the rotational axis 90 because the geared region 124 of the second shaft 106 is engaged with the internal gear 60 through the cavity opening 100. The journal 204 that is connected to the shaft end region 113 of the second shaft 106 with the aid of the connecting means 190, 208 and arranged eccentrically to the rotational axis of the second shaft 106 is therefore subjected to an eccentric rotational movement about the rotational axis 18 of the first shaft 20 that is superimposed with an eccentric rotational movement of the second shaft 106 about the rotational axis 90.

The second transmission chamber area 24 is filled with lubricant at least up to the height of the transmission chamber opening 158 of the channel 156. The passage cross section of the channel 156 is clearly reduced by the component 162 inserted into the transmission chamber opening 158 and the bore 164 provided in the component 162, respectively. Since the cavity opening 160 is arranged eccentrically to the transmission chamber opening 158 and the rotational axis 18, respectively, a rotation of the first shaft 20 generates suction that transports the lubricant from the transmission chamber opening 158 and into the cavity opening 160 through the channel 156. The passage cross section of the channel 156 is reduced by the bore and thereby results in a reduced quantity of lubricant being transported into the cavity 88. The lubricating effect can be easily adapted to the respective requirements of the transmission arrangement by adapting the bore 164 in such a way that an optimal quantity of lubricant is transported through the channel, which prevents excessive consumption of lubricant and extends the maintenance intervals.

The ventilation device 168 inserted into the housing cover 47 serves for ventilating the transmission arrangement 10. Compared with conventional devices, it provides the advantage that the pipe section is very long in relation to the diameter of the head 170. This makes it possible to reduce the contamination of the filter element because lubricant vapor ascending through the pipe 186 is able to deposit on the inner pipe wall and foaming or splashing lubricant cannot directly reach and thereby soil the filter. In addition, the lubricant ascending in the pipe 186 can escape through the bore 188. These measures extend the maintenance intervals and significantly improve the temperature and pressure conditions in the transmission chamber 12.

Although the invention was described with reference to only one embodiment, the preceding description as well as the figures should enable a person skilled in the art to realize numerous different alternatives, modifications and variations that also fall under the scope of the present invention. For example, the bearing arrangement 233 of an alternative embodiment may be equipped with a needle bearing 254 as shown in FIG. 12. In this alternative embodiment, a needle bearing 254 is provided that features an outer race 256, wherein this outer race features an outer surface 258 that is spherically curved outwardly, similarly to that of the bushing 240 in the embodiment described above. The outer race 256 is accommodated by an outer ring 260, where the outer ring 260 features an inner surface 262 that this realized congruent relative to the outer surface 258 of the outer race 256. The bearing arrangement 233 is tensioned by means of a second step bearing 264 that is provided with a cover 266 and tensioning screws 268. A corresponding connecting means 234 is connected without rotational play to the second step bearing 264. The utilization of such a needle bearing provides the advantage that needle bearings of this type are commercially available with pre-installed spherical outer races 256 and outer rings 260.

The invention claimed is:

1. A transmission arrangement with a transmission housing, a transmission chamber that is surrounded by the transmission housing, a first shaft mounted in the transmission housing, a cavity formed in the first shaft eccentrically to the rotational axis with the cross-sectional center of gravity thereof, and a channel formed in the first shaft and connecting the transmission chamber to the cavity of the first shaft wherein the channel is provided with a component that reduces the passage cross section of the channel.

2. The transmission arrangement of claim 1, wherein the channel features a transmission chamber opening that is arranged concentrically to the rotational axis of the first shaft and a cavity opening that is arranged eccentrically to the rotational axis of the first shaft, and the component is arranged on the transmission chamber opening.

3. The transmission arrangement of claim 2, wherein a journal is provided with a rolling bearing.

4. The transmission arrangement of claim 3, wherein the rolling bearing is in the form of a roller bearing, wherein an outer race of the rolling bearing is accommodated by a bushing with a spherically curved outer surface, and the spherically curved outer surface of the bushing is accommodated in a step bearing with an inner surface that is congruent relative to the outer surface of the bushing.

5. The transmission arrangement of claim 4, wherein the bushing and the step bearing are closed over their circumference, and the step bearing is provided with recesses that lie radially opposite one another and extend axially along the inner surface of the step bearing.

6. The transmission arrangement of claim 3, wherein the rolling bearing is a needle bearing that comprises an outer race with a spherically curved outer surface.

7. The transmission arrangement of claim 6, wherein the needle bearing comprises an outer ring that is provided with an inner surface congruent to the outer surface of the other race, wherein the race is accommodated by the outer ring and the outer ring of the needle bearing is supported in a step bearing.

8. The transmission arrangement of claim 7, wherein the step bearing for the rolling bearing of the journal is connected to a connecting means.

9. The transmission arrangement of claim 2, wherein the transmission chamber opening is provided with threads, and the component consists of a plug provided with threads and a bore.

10. The transmission arrangement of claim 2, further comprising a ventilating device provided on a transmission housing cover connecting the transmission chamber to the surroundings of the transmission housing.

11. The transmission arrangement of claim 10, wherein the ventilating device is realized in the form of a pipe construction that extends through a bore in the transmission housing cover and comprises a head and a pipe section that protrudes into the transmission chamber, wherein a filter element is on the head.

12. The transmission arrangemen of claim 11, wherein the pipe section has a length equal to a multiple of the diameter of the head.

13. The transmission arrangement claim 11, further comprising a wall of the pipe section having a bore.

14. The transmission arrangement of claim 1, further comprising a second shaft rotatably supported in the cavity of the first shaft.

15. The transmission arrangement of claim 14, wherein the second shaft is one piece and features at least first and second support regions, a geared region and a shaft end region that axially protrudes from the cavity of the first shaft, wherein one of the support regions is arranged between the geared region and the shaft end regions and the maximum outside diameter of the second shaft in the shaft end, first support, geared, and second support regions is one of constant and increasing toward the shaft end region.

16. The transmission arrangement of claim 15, wherein the geared region meshes with an internal gear that is connected to the transmission housing without rotational play.

17. The transmission arrangement of claim 15, wherein the shaft end region of the second shaft has connecting means.

18. The transmission arrangement of claim 17, further comprising a journal that extends from the shaft end region axially and eccentrically relative to the rotational axis of the second shaft.

19. The transmission arrangement of claim 18, wherein the journal connecting means that are connected to the connecting means of the shaft end region.

20. The transmission arrangement of claim 15, further comprising a cap for at least partially covering a gap formed between the shaft end region and the first shaft.

21. The transmission arrangement of claim 14, further comprising a third shaft mounted in the transmission housing and the rotational axis of which forms an angle with a plane that lies on the rotational axis of the first shaft.

22. The transmission arrangement of claim 21, further comprising a first bearing of the first shaft that serves for supporting said shaft with axial play, wherein the first bearing of the third shaft is in the form of a roller bearing.

23. The transmission arrangement of claim 21, further composing a second bearing of the third shaft that is fixed on the transmission housing axially outward by means of a snap ring.

24. The transmission arrangement of claim 21, further comprising a second bevel gear that is arranged on the third shaft and axially fixed on the third shaft in one direction only by means of a snap ring.

25. The transmission arrangement of claim 21, further comprising a first bevel gear that is fixed on the first shaft and meshes with a second bevel gear fixed on the third shaft wherein the first bevel gear of the first shaft is fixed radially relative to the rotational axis of the first shaft in a first bearing of the first shaft and exerts axial force upon the third shaft.

* * * * *

UNITED STATES PATENT AND TRADEMARK OFFICE
CERTIFICATE OF CORRECTION

| | | |
|---|---|---|
| PATENT NO. | : 7,845,253 B2 | Page 1 of 1 |
| APPLICATION NO. | : 11/659416 | |
| DATED | : December 7, 2010 | |
| INVENTOR(S) | : Monica Gil et al. | |

It is certified that error appears in the above-identified patent and that said Letters Patent is hereby corrected as shown below:

Item (54)
Title Reads - Tansmission Arrangement
Should Read:

TITLE - TRANSMISSION ARRANGEMENT

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,845,253 B2 | Page 1 of 1 |
| APPLICATION NO. | : 11/659416 | |
| DATED | : December 7, 2010 | |
| INVENTOR(S) | : Monica Gil et al. | |

It is certified that error appears in the above-identified patent and that said Letters Patent is hereby corrected as shown below:

Title Page, Item (54) and at Column 1, line 1,
Title Reads - Tansmission Arrangement
Should Read:

TITLE - TRANSMISSION ARRANGEMENT

This certificate supersedes the Certificate of Correction issued April 3, 2012.

Signed and Sealed this
First Day of May, 2012

David J. Kappos
*Director of the United States Patent and Trademark Office*